United States Patent [19]
Maier-Laxhuber et al.

[11] Patent Number: 5,585,145
[45] Date of Patent: Dec. 17, 1996

[54] ADSORBENT BED COATING ON METALS AND PROCESSING FOR MAKING THE SAME

[75] Inventors: Peter Maier-Laxhuber, Unterschleissheim; Reiner Engelhardt, München, both of Germany

[73] Assignee: Zeo-Tech GmbH, Unterschleissheim, Germany

[21] Appl. No.: 390,259

[22] Filed: Feb. 17, 1995

[30] Foreign Application Priority Data

Feb. 23, 1994 [DE] Germany ............................ 44 05 669.9

[51] Int. Cl.⁶ ....................................................... B05D 3/02
[52] U.S. Cl. ................. 427/380; 165/104.12; 427/407.1; 427/419.1; 502/67
[58] Field of Search ........................ 62/480; 165/104.12; 427/419.1, 380, 407.1; 502/67

[56] References Cited

U.S. PATENT DOCUMENTS

| | | | |
|---|---|---|---|
| 4,660,629 | 4/1987 | Maier-Laxhuber et al. | 165/104.12 |
| 4,674,563 | 6/1987 | Maier-Laxhuber et al. | 165/104.12 |
| 4,924,676 | 5/1990 | Maier-Laxhuber et al. | 165/104.12 |
| 5,456,093 | 10/1995 | Dunne et al. | 62/480 |

*Primary Examiner*—Michael Lusignan
*Attorney, Agent, or Firm*—Hoffmann & Baron

[57] ABSTRACT

Adsorbent bed coating for use on a metallic surface includes a powder-like solid adsorbent bed with a grain diameter between 1 and 50 μm bonded by a finely dispersed binder agent with a mass component of less than 50% with respect to the powder component. The thickness of the adsorbent bed coating on the metallic surface is less than 4 mm such that the adsorption speed of water vapor at a steam pressure of less than 20 mbar results in a weight increase of at least 5% (with respect to the adsorbent bed) within 30 minutes.

2 Claims, 1 Drawing Sheet

ADSORBENT BED COATING ON METALS AND PROCESSING FOR MAKING THE SAME

BACKGROUND OF THE INVENTION

1. Field of the Invention

The present invention relates to adsorbent coatings, and more particularly to adsorbent coatings that are applied to metallic surfaces and a process for applying the same.

2. Description of the Prior Art

Adsorbent beds are substances whose surface or capillary hollow space structure can adsorb a lighter volatile operating medium. Thus the adsorbent beds are typically well suited for heat transformation. European Patent Nos. EP 0 151 237 and EP 0 205 167 disclose typical embodiments of adsorbent beds. These adsorbent beds generally adsorb a vaporous operating medium stored in an evaporator by releasing the heat carried by the operating medium. As is known, the continued vaporization of operating medium generates cold in the evaporator. As a result, operating medium vapor will continue to be removed from the evaporator at lower temperatures. In order to expel the operating medium from adsorbent bed, heat is provided to the adsorbent bed which serves to again convert the operating medium to a vapor which is then reliquified in a condenser. In order to achieve rapid adsorption and expulsion of the operating medium by the adsorbent bed, the adsorbent bed should have a good heat conductivity in the adsorbent bed and a good heat transfer to heat exchanger faces.

European Patent No. EP 0 151 786 discloses an adsorption bed blank with a high heat conductivity and a method for making the same. The patent discloses admixing a powder-like adsorption medium (zeolite) with a binder agent and water. The mixture, which is in a semi-liquid state, is poured into receptacles, specifically heat exchangers. After the mixture is dried and gelled, the zeolite adsorption medium is prepared to adsorb operating medium. The zeolite mixture is not applied to strategically mounted flow conduits so as to ensure that an inflow of vapor is not substantially disrupted. One disadvantage of this configuration is that during frequent and rapid temperature changes, the zeolite blank will separate from the heat exchanger surface. Therefore, a rapid heat exchange between the heat exchanger and the zeolite is no longer assured.

A further disadvantage of the above-identified adsorption bed blanks is that structures which contain zeolite generally conduct heat relatively poorly. Despite having good heat exchanger geometries, the time period required for the adsorption and expulsion of operating medium vapor is in the range of from a few minutes to hours. These adsorption blank structures are unsuitable in devices that have strict weight limits such as those that are intended to be mobile.

Commercial zeolites are available as either a powder or granulate, in spherical or cylinder form. Zeolite powder is incapable of being used in the aforementioned adsorption system because the inflow and outflow of operating medium vapor will remove the zeolite powder from the adsorption system. Granulate zeolite may be utilized in the above-described system but, the device still has the aforementioned disadvantages of poor heat conductivity and poor heat contacting. Both natural and synthetic zeolites adsorb a certain amount of operating medium vapor and thereafter again emit the operating medium when heat is applied. The absorbability of zeolites may differ by more than 25% by weight depending upon the type of zeolite. However, for most zeolites, the desorption temperatures for complete expulsion of operating medium must be between 200° and 300° C. But, when the zeolite adsorbs operating medium vapor, the temperature of the adsorption bed blank should preferably be below 100° C. This provides very high temperature differences between the operating medium vapor and the adsorption bed blank which can only be realized with large heat exchanger faces having thin zeolite layers.

Since the desorption temperatures of zeolite are typically above 200° C., the employment of metallic heat exchangers is advantageous. However, due to the differences in heat expansion coefficients between the adsorbent bed coating and the metallic heat exchangers, the adsorbent bed coating typically separates from the heat exchanger. When cracks develop between the adsorbent bed coating and the heat exchanger faces, heat transfer between the adsorbent bed coating and heat exchanger is severely limited. This results in longer cycle times and requires larger amounts of adsorbent bed coatings for the given intended application. In addition to a good contact between the adsorbent bed coating and the metallic heat exchanger, a sufficient input of operating medium vapor must be assured for proper operation. However, an adsorbent bed coating that maintains relatively good heat contact with metallic surfaces such that a sufficient input of operating medium vapor is assured and the adsorbability of the adsorbent bed is uninterrupted is not previously known.

OBJECT AND SUMMARY OF THE INVENTION

It is therefore an object of the present invention to provide a structure which enables a very good adherence of an adsorbent bed coating to a heat exchanger during very rapid temperature increases and decreases.

It is another object of the present invention to provide an adsorbent bed coating that has relatively good heat transfer characteristics with a metallic surface of a heat exchanger.

It is a further object of the present invention to provide a method of applying an adsorbent bed material to a heat exchanger so that the adsorbent bed material adheres to the heat exchanger.

It is a further object of the present invention to provide an adsorbent bed material that has relatively good adsorbability while contacting a heat exchanger surface.

It is a further object of the present invention to provide an adsorbent bed material and method of adhering the same to the surface of a heat exchange which overcomes the inherent disadvantages of known adsorbent bed materials.

In accordance with one form of the present invention, the adsorbent bed coating for use on a metallic surface includes a solid adsorbent material having a grain diameter of between 1 and 50 μm and a finely dispersed dehardened binder agent. Preferably, the binder agent is less than 50% of the solid adsorbent material. In addition, the solid adsorbent material is preferably a zeolite and the finely dispersed dehardened binder agent is preferably a high temperature adhesive.

In accordance with another form of the present invention a heat exchanger including a flow conduit and means for transferring heat energy to and from the flow conduit includes an adsorbent bed coating on the means for transferring heat energy. Preferably, the adsorbent bed coating has a thickness that is at most 4mm wherein the adsorption speed for water vapor at a steam pressure of less than 20 mbar provides a 5% weight increase in the adsorbent bed coating within 30 minutes. In one form of the present invention, the heat exchanger is a lamella heat exchanger and the means for transferring heat energy is a metal.

In accordance with another form of the present invention, a method for providing an adsorbent bed coating on a heat exchanger includes applying an emulsion including a binder agent, water and an adsorbent bed material to an oil and dust free metal surface of the heat exchanger. Preferably, the flowable emulsion has a thickness of no more than 1 mm. The method also includes wetting the heat exchanger including the flowable emulsion and drying the heat exchanger in open air. Thereafter, the heat exchanger and adsorbent bed coating is dried at air temperatures over 150° C. The method of the present invention may also include applying a second adsorbent coating layer to the first layer. Thereafter, the second coating layer is dried and hardened at air temperatures above 150° C.

A preferred form of the adsorbent bed material as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
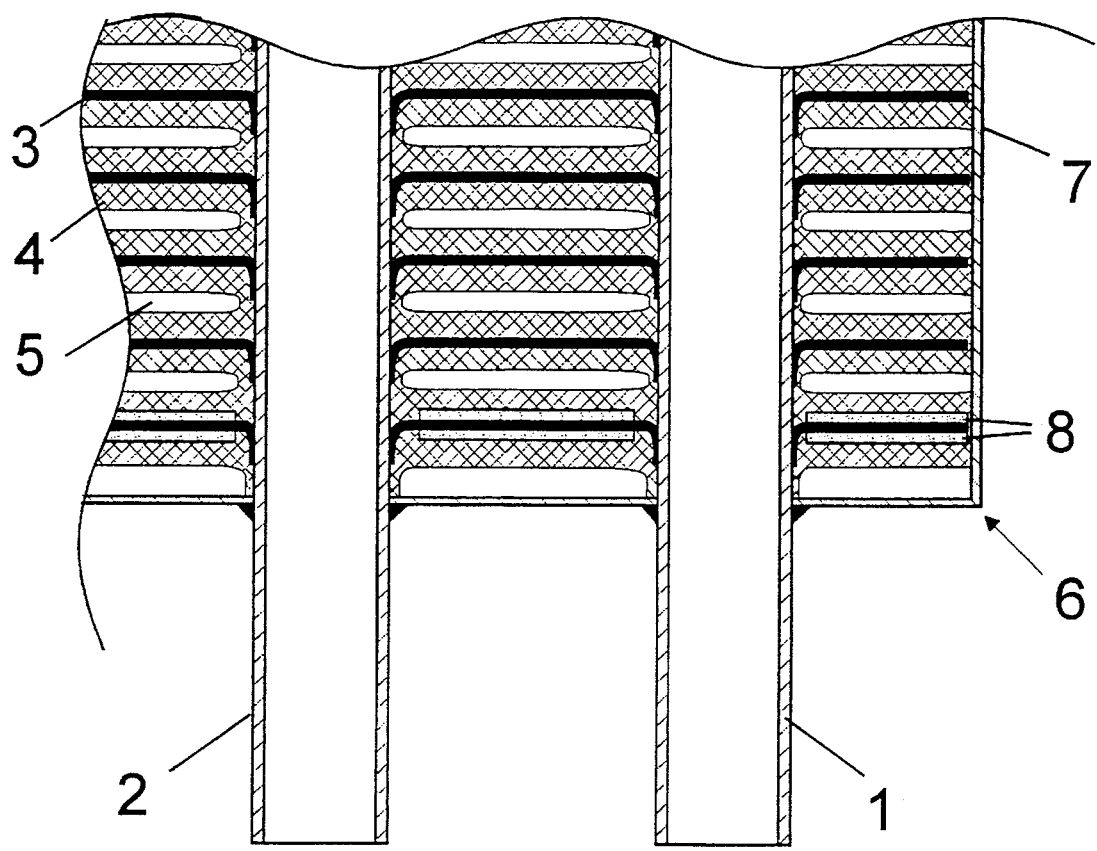
FIG. 1 is a cross-section of a pipe-lamella heat exchanger having an adsorbent bed material of the present invention coated thereon.

Referring now to the drawings, FIG. 1 shows a cross-sectional view of a pipe-lamella-heat exchanger with pipes 1 and 2 having lamellas 3 mounted thereon. In a preferred embodiment of the invention the lamellas are made of aluminum. Pipes 1, 2 and lamellas 3 are preferably coated with a zeolite layer 4 in accordance with the invention. Flow conduits 5 are located between the coated lamellas 3 for the unobstructed access of operating medium vapor. The coated pipe-lamella-heat exchanger is built into a housing 6, whose exterior wall 7 is supported by a front face of the lamella 3. In a preferred embodiment of the invention, the lamellas 3 have a fiber fleece 8 bonded thereto before the lamellas are coated with the zeolite layer 4.

In operation, a relatively hot medium flows through pipe 1 effectively transferring heat through the lamellas 3 to the zeolite layer 4. When the zeolite layer is heated, operating medium vapor is expelled from the zeolite layer. The expelled operating medium thereafter is provided through the flow conduits 5 to a vapor collector (not shown). Additionally, a relatively cold medium may simultaneously flow through pipe 2 and effectively absorb heat through lamellas 3 to cool the zeolite layer 4 and lower the vapor pressure of the operating medium vapor. As a result, operating medium vapor flows in from an operating medium vapor source (not shown) for adsorption by the zeolite layer 4.

The requirement of good adherence to the heat exchanger, good heat transfer characteristics and good adsorbability of operating medium are present in the adsorbent bed coating of the present invention. Specifically, sufficient mechanical and thermal stability is obtained by adsorbent material, such as zeolite powder, with a grain size of between 1 and 50 µm. The zeolite powder is preferably admixed with a ceramic binder agent that is less than 50% by weight of the adsorption bed coating. In addition, the thickness of the adsorption bed coating or the heat exchangers is preferably less than 5 mm. The limitation of the thickness of the adsorption bed coating does not limit the adsorbability of the operating medium. In fact, the maximum adsorbability of operating medium occurs within a few minutes of the time of application of the adsorbent bed coating to the heat exchanger.

When zeolite is employed as the adsorbent material, the adsorption bed coating is stable at temperatures between −30° C. and 300° C. High temperature adhesives that are utilized for adhering ceramic and glass products on metals are particularly suitable for use as binder agents in the present invention. The use of high temperature adhesives permits the adhesive bed coating to be utilized even under relatively high thermal stresses.

It has been determined that an adsorption bed coating thickness of less than 5 mm on the heat exchanger is preferable to thicker layers. This is because thicknesses of greater than 5 mm cause an increase in the diffusion resistance of the operating medium vapors. In addition, an adsorption bed coating thickness of more than 5 mm decreases the conductivity of thermal energy. This neutralizes the positive effects provided by the increased contact with the heat exchanger provided by the adsorption bed coating of the invention.

The heat exchanger lamellas utilized in the present invention are preferably made of a metallic material whose surface is roughened and which has been cleaned so as to be both oil and dust free. After the cleaning and roughening, the coating may be applied to the lamellas. The lamellas can be made from any metal that has a relatively good heat conductibility. Among the suitable materials for use in fabricating the lamellas are aluminum and copper.

In accordance with the present invention, particularly good results may be obtained with lamella heat exchangers wherein the separation between lamellas is less than 2 mm. The heat exchanger may be coated with one or a plurality of adsorbent bed coating layers via a dipping process. The thickness of all of the layers is selected in such a manner that substantially sufficient free space is provided between the coated lamellas for the inflow and outflow of the operating medium vapor. In view of the thin adsorbent bed layers on the lamellas, very rapid cycle times may be obtained, which in practice, may be less than 2 minutes.

In addition, satisfactory results have been obtained when thin metal foils have been coated with the adsorbent bed coating. Thin foils are formed as a result of a dipping process wherein a complete closed receptacle is made from two semicups. A zeolite layer is mounted on a first part of the receptacle, while in a second part of the receptacle, space is provided for the condensation and evaporation of operating medium. The receptacles also called spokes, are described in European patent EP 0 151 237, the description of which is incorporated herein by reference.

In a preferred embodiment of the present invention, it is advantageous to apply an intermediate layer of fiberglass fleece to the metal surface of the lamellas before applying the adsorbent bed. As a result, durable adsorbent bed layers having a relatively large thickness are possible. In addition, the fiberglass fleece assures a stable anchoring or bonding of the adsorbent bed layer to the metal surface.

The mechanical and thermal stability of the adsorbent bed layer is directly dependant upon its method of preparation (i.e., the method of application of the adsorption bed coating). Specifically, it has been found that the structure is more durable if thin layers are applied. However, if thick layers are required, the application of many thinner layers is preferred to provide a more durable structure.

In accordance with one form of the invention, an adsorbent bed coating (i.e., flowable emulsion) is prepared by adding an adhesive and water to zeolite powder (i.e., powder-like adsorbent bed). The coating is then applied to the lamella (i.e., metal surface) of the heat exchanger in a variety of ways. In particular, dipping, painting and spray methods are suitable application methods.

The thickness of the layer of adsorbent bed coating layers depend upon the consistency of the emulsion prior to application and the method of application (i.e., dipping, painting, or spraying). Preferably, the emulsion is dried after it is applied to the heat exchanger. In a preferred embodiment of the invention, each emulsion layer is dried and hardened at temperatures over 150° C. in order to obtain a durable adsorbent bed coating structure.

In accordance with the present invention, a plurality of layers may be successively applied to the heat exchanger. However, it is preferred that each preceding layer be permitted to dry for as long as it takes for the emulsion to harden and for its surface to dull. In a preferred embodiment, only then should a subsequent adsorbent bed coating be applied to the previous layer. Preferably, for each layer, a redrying process in open air as well as a final drying process including hardening in a furnace is conducted for each individual emulsion layer.

In a preferred form of the invention, the adsorbent bed coating (flowable emulsion) is prepared by diluting 30 g of a commercially available high temperature resistant adhesive suitable for ceramic products (for example, Holts Gun Gum) with 105 g water. Thereafter, 100 g of a zeolite powder with Na-A which was previously saturated with water vapor in open air is introduced into the high temperature resistant adhesive emulsion while stirring constantly. Since the zeolite crystals and the adhesive will separate if the mixture is left to stand without agitation, substantially constant mixing of the emulsion must be assured.

The surfaces of the heat exchanger that are to be coated are preferably oil and dustfree and are thereafter dipped into the prepared mixture. After removal of the heat exchanger from the emulsion, the heat exchanger is redried in open air at room temperature and thereafter heated in a furnace at temperatures above 150° C. As a result, the water adsorbed in the adsorbent bed coating is evaporated and the adhesive is permitted sufficiently harden.

In a preferred embodiment, before applying a second layer of high temperature resistant adhesive emulsion, the first layer is preferably wet with water. This is preferably performed by dipping or spraying the heat exchanger with water. Thereafter, care should be taken that before application of the second layer of high temperature resistant adhesive, the first layer is dried in open air until the surface of the coating is dull. Only after this drying process is complete should the second layer of emulsion be applied to the heat exchanger. The second layer of emulsion should be dried in a manner similar to that of the drying of the first emulsion layer. A final drying and the hardening process which includes drying in a furnace is thereafter performed as previously described.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for providing an adsorbent bed coating on a heat exchanger comprising the following steps in the sequence set forth:

a) applying a first coating of flowable emulsion including a binder agent, water and a solid adsorbent material to a surface of the heat exchange, the application of the flowable emulsion having a thickness of no more than 1 mm, b) drying the flowable emulsion that was applied to the heat exchanger in open air at approximately room temperature; and c) drying the flowable emulsion at air temperatures of over 150° C. to provide a first adsorbent bed coating layer.

2. The method for providing an adsorbent bed coating on a heat exchanger as defined in claim 1, further comprising the following additional steps in the sequence set forth:

a) subsequent to said step of drying said emulsion at air temperatures of over 150° C. wetting the heat exchanger including the first adsorbent bed coating layer;

b) drying the first adsorbent bed coating layer of the heat exchanger in open air such that a dull surface is visible;

c) applying a second coating of flowable emulsion to the surface of the first adsorbent bed coating layer, the second coating of flowable emulsion having a thickness of at most 1 mm;

d) drying said second coating of flowable emulsion in open air at approximately room temperature; and e) drying and hardening said second coating of flowable emulsion at air temperatures above 150° C. to provide a second adsorbent coating layer.

* * * * *